(12) United States Patent
Shen et al.

(10) Patent No.: US 12,450,264 B2
(45) Date of Patent: Oct. 21, 2025

(54) DATA STORAGE METHOD AND DATA STORAGE APPARATUS FOR STRING DATA

(71) Applicant: Alipay (Hangzhou) Information Technology Co., Ltd., Zhejiang (CN)

(72) Inventors: Zhitao Shen, Zhejiang (CN); Jiujing Zhang, Zhejiang (CN); Lingkai Meng, Zhejiang (CN); Shiyu Yang, Zhejiang (CN); Wei Jia, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 33 days.

(21) Appl. No.: 18/413,729

(22) Filed: Jan. 16, 2024

(65) Prior Publication Data

US 2024/0241892 A1 Jul. 18, 2024

(30) Foreign Application Priority Data

Jan. 18, 2023 (CN) .......................... 202310095847.1

(51) Int. Cl.
*G06F 16/28* (2019.01)
*G06F 16/215* (2019.01)

(52) U.S. Cl.
CPC .......... *G06F 16/288* (2019.01); *G06F 16/215* (2019.01)

(58) Field of Classification Search
CPC .............................. G06F 16/288; G06F 16/215
See application file for complete search history.

(56) References Cited

U.S. PATENT DOCUMENTS

| | | | | |
|---|---|---|---|---|
| 9,336,313 | B1* | 5/2016 | Salessi | G06F 3/061 |
| 9,392,005 | B2* | 7/2016 | Yoo | G06F 21/564 |
| 10,564,850 | B1* | 2/2020 | Gud | G06F 3/0608 |
| 11,514,188 | B1* | 11/2022 | Jassal | G06N 20/00 |
| 2012/0185612 | A1* | 7/2012 | Zhang | H03M 7/30 709/247 |
| 2014/0129577 | A1* | 5/2014 | Young, Jr. | H04L 67/02 707/E17.014 |
| 2017/0255867 | A1* | 9/2017 | Ramachandran | G06F 16/2358 |
| 2020/0133933 | A1* | 4/2020 | Ricard | G06F 16/2282 |
| 2021/0294850 | A1* | 9/2021 | Fauber | G06Q 50/265 |
| 2022/0342879 | A1* | 10/2022 | Dong | G06F 16/2458 |
| 2024/0176781 | A1* | 5/2024 | Fabris | G06F 16/24542 |

* cited by examiner

*Primary Examiner* — Huawen A Peng
(74) *Attorney, Agent, or Firm* — Finnegan, Henderson, Farabow, Garrett & Dunner, LLP

(57) ABSTRACT

A data storage method for string data includes: performing pattern matching on each piece of string data in a to-be-stored string data set by using a pattern data set, to determine whether the string data includes matched pattern data in the pattern data set; in response to that the string data includes the matched pattern data, extracting dedicated string data other than the matched pattern data from the string data, and storing the extracted dedicated string data in a dedicated data storage area of the data storage system, wherein an index relationship is formed between the stored dedicated string data and corresponding pattern data stored in the pattern data storage area; and in response to that the string data does not include the matched pattern data, storing original data of the string data in the dedicated data storage area as a whole.

20 Claims, 12 Drawing Sheets

0 Vscompany_charging-100-57accenter20ac_accounting-_log_202024050
1 Vscompany_charging-100-72accenter11ac_accounting-_log_202024081
2 Vscompany_charging-100-15accenter42accounting-_log_id202204420
3 Vscompany_charging-100-46accenter32ac_accounting-_log_202024081
4 Name: "Zhang San", Age: "23", Sex: "Male"
5 Name: "Wang Juan", Age: "17", Sex: "Female"

FIG. 2

DATA STORAGE METHOD AND DATA STORAGE APPARATUS FOR STRING DATA

CROSS-REFERENCE TO RELATED APPLICATIONS

The present application is based upon and claims priority to Chinese Patent Application No. 202310095847.1, filed on Jan. 18, 2023, the entire content of which is incorporated herein by reference.

TECHNICAL FIELD

Embodiments of this specification generally relate to the data storage field, and in particular, to a data storage method and a data storage apparatus for string data.

BACKGROUND

With rapid development of computer technologies and network technologies, people use networks for access and operations more frequently, so that more data and information are generated online. The data and information need to be stored (or cached) in a database system for subsequent query and use. The database system can implement sharing and centralized management of data in a database. The centralized management includes operations such as writing, reading, and modifying the data. The data managed by the database system is stored in a data storage system, and therefore space and an access speed of the data storage system affect data management operations of the database system. As an amount of data that needs to be stored becomes larger and larger, how to improve data storage efficiency of the data storage system becomes an issue to be urgently addressed.

SUMMARY

Embodiments of this specification provide a data storage method and a data storage apparatus for string data. Using the data storage method and the data storage apparatus can improve data storage efficiency of string data.

According to an aspect of embodiments of this specification, a data storage method for string data includes: performing pattern matching on each piece of string data in a to-be-stored string data set by using a pattern data set, to determine whether the string data includes matched pattern data in the pattern data set, where the pattern data set is obtained through training by using a string data sample set sampled from the to-be-stored string data set, and each piece of pattern data is common string data of a plurality of string data samples and is stored in a pattern data storage area of a data storage system; in response to that the string data includes the matched pattern data, extracting dedicated string data other than the matched pattern data from the string data, and storing the extracted dedicated string data in a dedicated data storage area of the data storage system, where an index relationship is formed between the stored dedicated string data and corresponding pattern data stored in the pattern data storage area; and in response to that the string data does not include the matched pattern data, storing original data of the string data in the dedicated data storage area as a whole.

According to another aspect of embodiments of this specification, a data storage apparatus for string data includes: a processor; and a memory storing instructions executable by the processor. The processor is configured to: perform pattern matching on each piece of string data in a to-be-stored string data set by using a pattern data set, to determine whether the string data includes matched pattern data in the pattern data set, where the pattern data set is obtained through training by using a string data sample set sampled from the to-be-stored string data set, and each piece of pattern data is common string data of a plurality of string data samples and is stored in a pattern data storage area of a data storage system. The processor is further configured to: in response to that the string data includes the matched pattern data, extract dedicated string data other than the matched pattern data from the string data, and store the extracted dedicated string data in a dedicated data storage area of the data storage system, where an index relationship is formed between the stored dedicated string data and corresponding pattern data stored in the pattern data storage area; and in response to that the string data does not include the matched pattern data, store original data of the string data in the dedicated data storage area as a whole.

According to another aspect of embodiments of this specification, a non-transitory computer-readable storage medium has stored thereon instructions that, when executed by a processor, cause the processor to perform the above data storage method for string data.

BRIEF DESCRIPTION OF DRAWINGS

The accompanying drawings are briefly described below. In the accompanying drawings, similar components or features may have the same reference numerals.

FIG. 2 is an example schematic diagram of string data according to an embodiment of this specification.

DETAILED DESCRIPTION OF EMBODIMENTS

Figure 1:
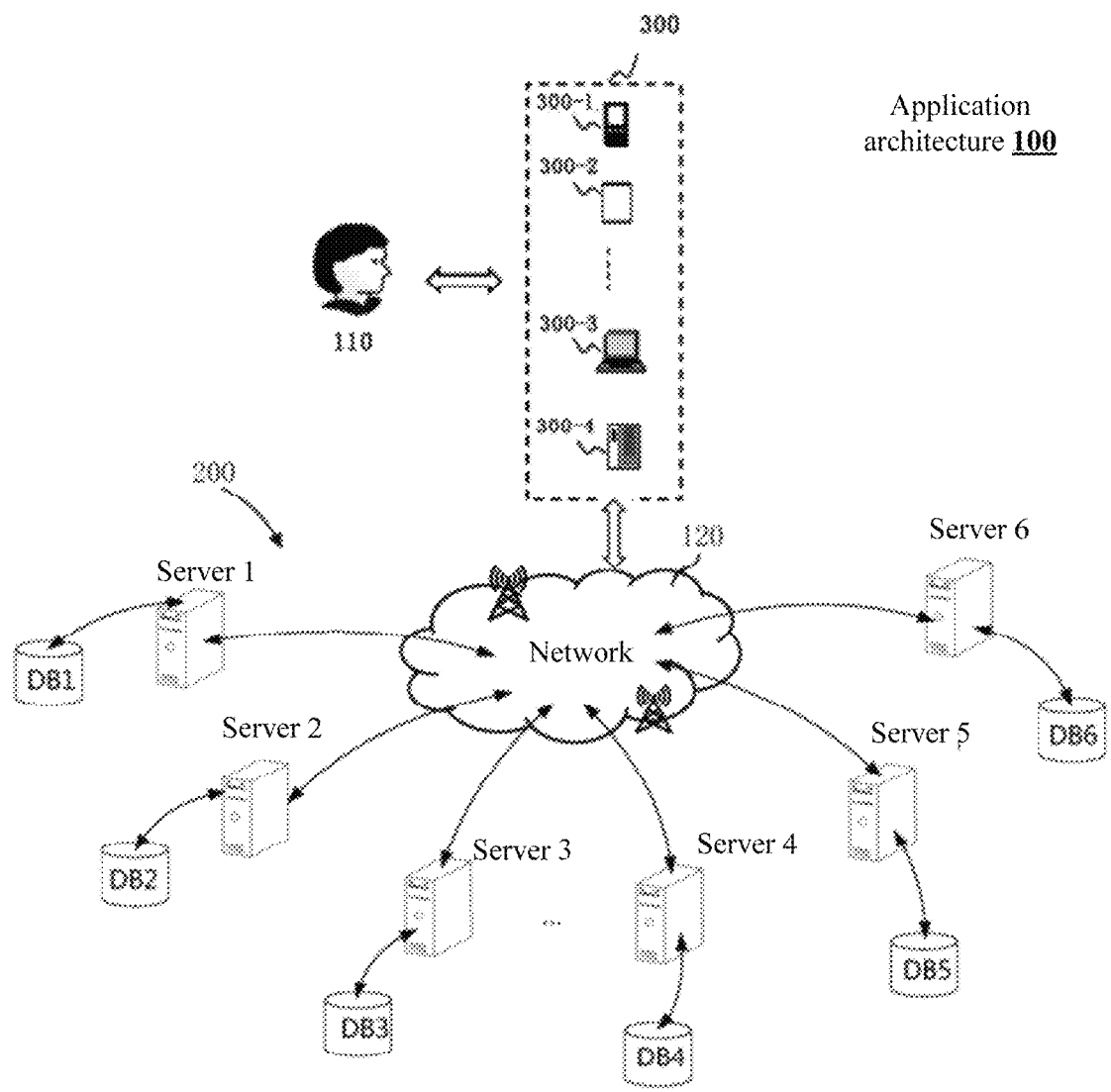
FIG. 1 is an example schematic diagram of an application architecture of a data storage system for string data according to an embodiment of this specification.

Reference will now be made in detail to example embodiments, which are not intended to limit the protection scope, applicability, or the claims. The functions and arrangements of the elements described can be changed without departing from the protection scope of this specification. Various processes or components can be omitted, replaced, or added in various examples as needed. For example, the described method can be performed in a sequence different from the described sequence, and the steps can be added, omitted, or combined. In addition, the features described relative to some examples can be combined in other examples.

As used in this specification, the term "include" and variants thereof represent an open term, which means "including but not limited to". The term "based on" represents "at least partially based on". The terms "one embodiment" and "an embodiment" represent "at least one embodiment". The term "another embodiment" represents "at least one other embodiment". The terms "first", "second", and the like may refer to different or the same objects. Other definitions, whether explicit or implicit, may be included below. Unless expressly specified in the context, the definition of a term is consistent throughout this specification.

The flowcharts used in this specification illustrate the operations implemented by the systems according to some embodiments of this specification. It should be clearly understood that the operations in the flowcharts may not be implemented in sequence. On the contrary, the operations can be implemented in a reverse sequence or simultaneously. In addition, one or more other operations can be added to the flowcharts. One or more operations can be removed from the flowcharts.

When the data generated online is stored or cached, storage is usually performed by using an entirety of each piece of data as a minimum unit. In addition, to improve data storage efficiency and optimize data storage space, a data storage solution based on data compression is provided. In this data storage solution, before data is stored, the data is compressed by using a fixed-size data block as a basic unit. Then, the compressed data is stored in a data storage system. However, in this data storage solution in which data compression is performed by using a data block as a basic unit, random access to the compressed data is not supported. To access a single piece of data, the entire data block needs to be decompressed first, thereby causing a long data access delay. If compression is performed by using a single piece of data as a basic unit, a data compression rate is greatly affected, and data storage efficiency is further affected.

In addition, data generated by online access is string data generated based on some specific rules or serialization methods. For example, the string data may be semi-structured data generated based on a plurality of generation rules, for example, key-value data, where key represents a value keyword, and value represents a value corresponding to the keyword. For example, examples of the generated string data may include but are not limited to JSON data, log data, XML data, and the like. Some of the generated string data has the same sub-string part. When data storage is performed on the string data, if storage is performed by using an entirety of each piece of data as a minimum unit, the same sub-string part is repeatedly stored, thereby affecting storage efficiency of the data storage system.

In view of the foregoing description, embodiments of this specification provide a data storage method and a data storage apparatus for string data. According to the data storage method and the data storage apparatus, a pattern data set is obtained through training based on a string data sample set sampled from a to-be-stored string data set, and each piece of pattern data in the pattern data set is stored in a pattern data storage area of a data storage system. Then, pattern matching is performed on each piece of to-be-stored string data by using the pattern data set. For string data that has matched pattern data, dedicated string data other than the matched pattern data is extracted from the string data, the extracted dedicated string data is stored in a dedicated data storage area, independent of the pattern data storage area, of the data storage system, and an index relationship is formed between the stored dedicated string data and corresponding pattern data stored in the pattern data storage area. For string data that does not have matched pattern data, original data of the string data is stored in the dedicated data storage area as a whole. According to the above method, for a plurality of pieces of string data that have the same pattern data, a single piece of pattern data is stored only in the pattern data storage area, and remaining dedicated string data of each piece of string data is stored in the dedicated data storage area. Therefore, data storage efficiency for the string data can be improved.

With reference to the accompanying drawings, the following describes a data storage method and a data storage apparatus according to embodiments of this specification.

FIG. 1 is an example schematic diagram of an application architecture 100 of a data storage system for string data according to an embodiment of this specification. As shown in FIG. 1, the application architecture 100 may include a server 200, a client 300, and a network 120.

The client 300 may be an electronic device on which a target application (target APP) is installed. A user 110 may be a user of the client 300. The client 300 can be communicatively connected to the server 200. In some embodiments, one or more applications (APPs) can be installed on the client 300. The installed APP can provide the user 110 with a capability and an interface to interact with the server 200 through the network 120. The target APP is a client APP corresponding to the server 200. In some embodiments, the client 300 may include a mobile device 300-1, a tablet computer 300-2, a notebook computer 300-3, a built-in device of a motor vehicle 300-4, or the like, or any combination thereof. In some embodiments, the mobile device 300-1 may include a smart household device, a smart mobile device, or the like, or any combination thereof. In some embodiments, the smart household device may include a smart TV, a desktop computer, or the like, or any combination thereof. In some embodiments, the smart mobile device may include a smartphone, a personal digital assistant, or the like, or any combination thereof. In some embodiments, the client 300 may be a device with a positioning technology for determining a location of the client 300.

The server 200 can store data or instructions that perform the data storage method for string data described in the embodiments of this specification, and can execute the data and/or the instructions. The client 300 may have a permission to access the server 200, so as to access, through the network 120, the data or instructions stored in the server 200. The server 200 may include a data storage system to store string data obtained from the client 300. The data storage system may be a memory storage system and a hard disk storage system, or may be a cache storage system.

The string data obtained from the client 300 may be string data generated by the user 110 based on some specific rules or serialization methods during online access, for example, key-value data, where key represents a value keyword, and value represents a value corresponding to the keyword. For example, examples of the generated string data may include but are not limited to JSON data, log data, XML data, and the like. Some of the generated string data has the same sub-string part.

FIG. 2 is an example schematic diagram of string data according to an embodiment of this specification. In the example of string data shown in FIG. 2, the first four pieces of data are service string data generated by a serialization method extracted from an actual database system. The last two pieces of data are key-value data, and each piece of key-value data includes three key-value pairs. For example, the fifth piece of data includes "Name: 'Zhang San'", "Age: '23'", and "Sex: 'Male'", and the sixth piece of data includes "Name: 'Wang Juan'", "Age: '17'", and "Sex: 'Female'".

The server 200 can be responsible for all operation requests such as writing, reading, and deleting string data. All requests such as writing, reading, and deleting string data are completed by the server 200. These requests may come from the client 300. The server 200 may be a stand-alone server. The server 200 may alternatively be a distributed server cluster. The distributed server cluster may include a plurality of sub-servers that are connected in a distributed manner. The plurality of sub-servers can communicate and exchange data and information with each other. For example, the plurality of sub-servers can be connected together through the network 120. The plurality of sub-servers can share one common work objective. Each sub-server among the plurality of sub-servers achieves one or more sub-objectives of the work objective, and transfers running results of the sub-objectives to other sub-servers that need the sub-objectives. In addition to including one or more processors, each sub-server may further include one or more storage media (such as memories) to store string data and other data that needs to be stored during processing of the sub-objectives. Certainly, each sub-server can also share one or more storage media (for example, memories). The storage media can be connected to each sub-server through the network 120. The data or the instructions for the data compression method for key-value storage described in this specification can be stored in the storage media. The sub-server may be a general-purpose computer or a dedicated computer. For example, the sub-server may be a server, a personal computer, or a portable computer (such as a notebook computer or a tablet computer), or may be another electronic device with a computing capability.

The network 120 can facilitate the exchange of information and/or data. As shown in FIG. 1, the client 300 and the server 200 can be connected to the network 120, and transmit information and/or data to each other through the network 120. For example, the server 200 can obtain string data from the client 300 through the network 120. In some embodiments, the network 120 may be any type of wired or wireless network, or a combination thereof. For example, the network 120 may include a cable network, a wired network, a fiber-optic network, a telecommunication network, an intranet, an internet, a local area network (LAN), a wide area network (WAN), a wireless local area network (WLAN), a metropolitan area network (MAN), a wide area network (WAN), a public switched telephone network (PSTN), a Bluetooth network, a ZigBee network, a near field communication (NFC) network, or the like. In some embodiments, the network 120 may include one or more network access points. For example, the network 120 may include a wired or wireless network access point, and one or more components of the client 300 and the server 200 can be connected to the network 120 to exchange data and/or information.

As shown in FIG. 1, the user 110 can perform, on the client 300, an operation request such as data writing or data deletion and modification on the string data, and the operation request is transmitted to the server 200 through the network 120. The server 200 executes the instructions for the data storage method for string data described in the embodiment of this specification, and stores the written string data in the data storage system.

Figure 3:
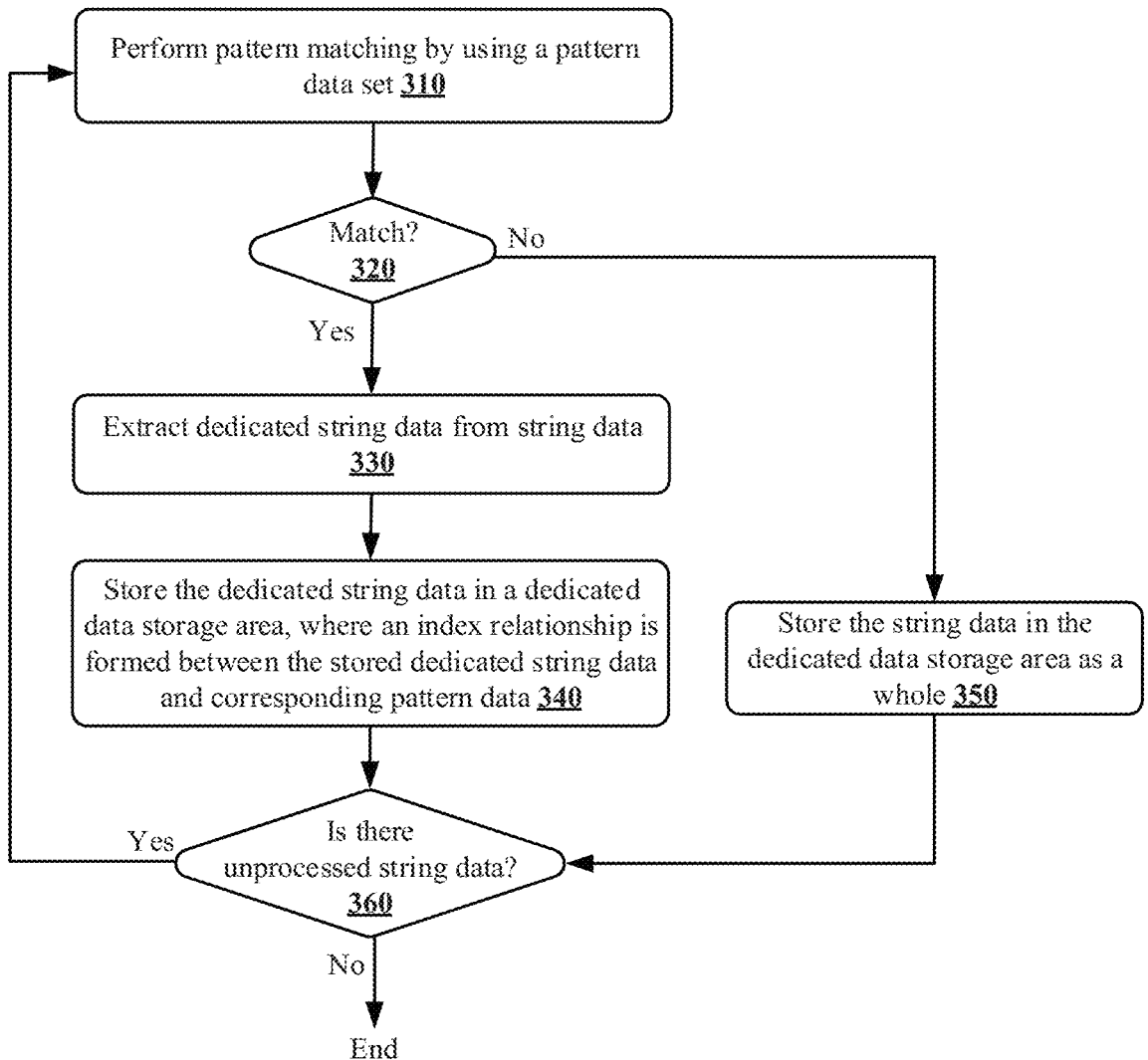
FIG. 3 is an example flowchart of a data storage method for string data according to an embodiment of this specification.

FIG. 3 is an example flowchart of a data storage method 300 for string data according to an embodiment of this specification.

As shown in FIG. 3, after a to-be-stored string data set is received, operations in steps 310 to 360 are cyclically performed to store string data.

Before the cyclic process shown in FIG. 3 is performed, a pattern data set is obtained through training by using a string data sample set sampled from the to-be-stored string data set. The pattern data set obtained through training may include one or more pieces of pattern data, and each piece of pattern data is common string data extracted based on a plurality of string data samples. For example, based on the first four pieces of string data shown in FIG. 2, one piece of pattern data, "VScompany_charging-100*<2, number>accenter*<2, number>ac*<VARCHAR>counting_log_*<VARCHAR>202*<6, number>", can be obtained through training. Then, each piece of extracted pattern data is stored in a pattern data storage area of a data storage system. Here, the pattern data storage area may also be referred to as a common data storage area or a public data storage area.

In some embodiments, the pattern data set is obtained through training based on a hierarchical clustering algorithm by using the string data sample set. The used string data sample set may include some or all of to-be-stored string data sets.

Figure 4:
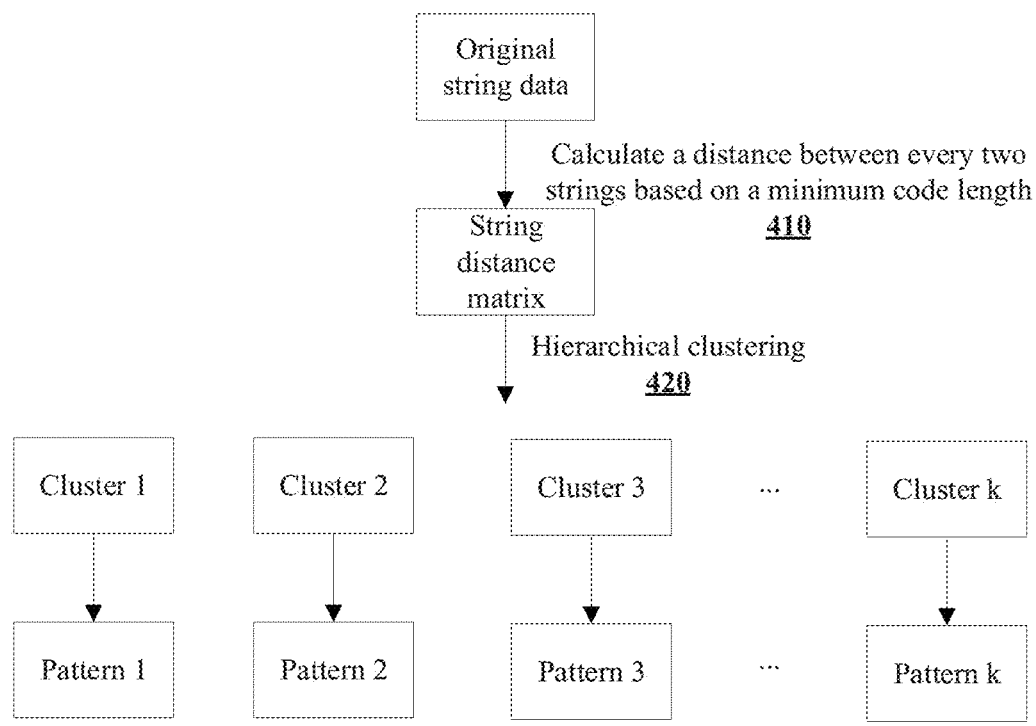
FIG. 4 is an example schematic diagram of a pattern data set training process based on hierarchical clustering according to an embodiment of this specification.

FIG. 4 is an example schematic diagram of a pattern data set training process based on hierarchical clustering according to an embodiment of this specification. As shown in FIG. 4, in step 410, for original string data of the string data sample set, a distance between every two pieces of string data is calculated with a minimum code length as a basic indicator. Here, for each string pair, a code length gain obtained after string combination is performed on the two strings is calculated, that is, a code length that is added after the two strings are combined into one string is calculated, and the calculated code length gain is used as a distance between the two pieces of string data in the string pair. Then, in step 420, a distance matrix (a similarity matrix) of the string data sample set is constructed based on the calculated string distance. For example, for n strings, a distance matrix of n×n dimensions can be constructed. Then, hierarchical clustering is performed based on the obtained distance matrix to obtain a preset quantity (for example, k) of clusters, and one piece of pattern data is extracted from each cluster, so as to obtain a pattern data set with k pieces of pattern data.

Figure 5:
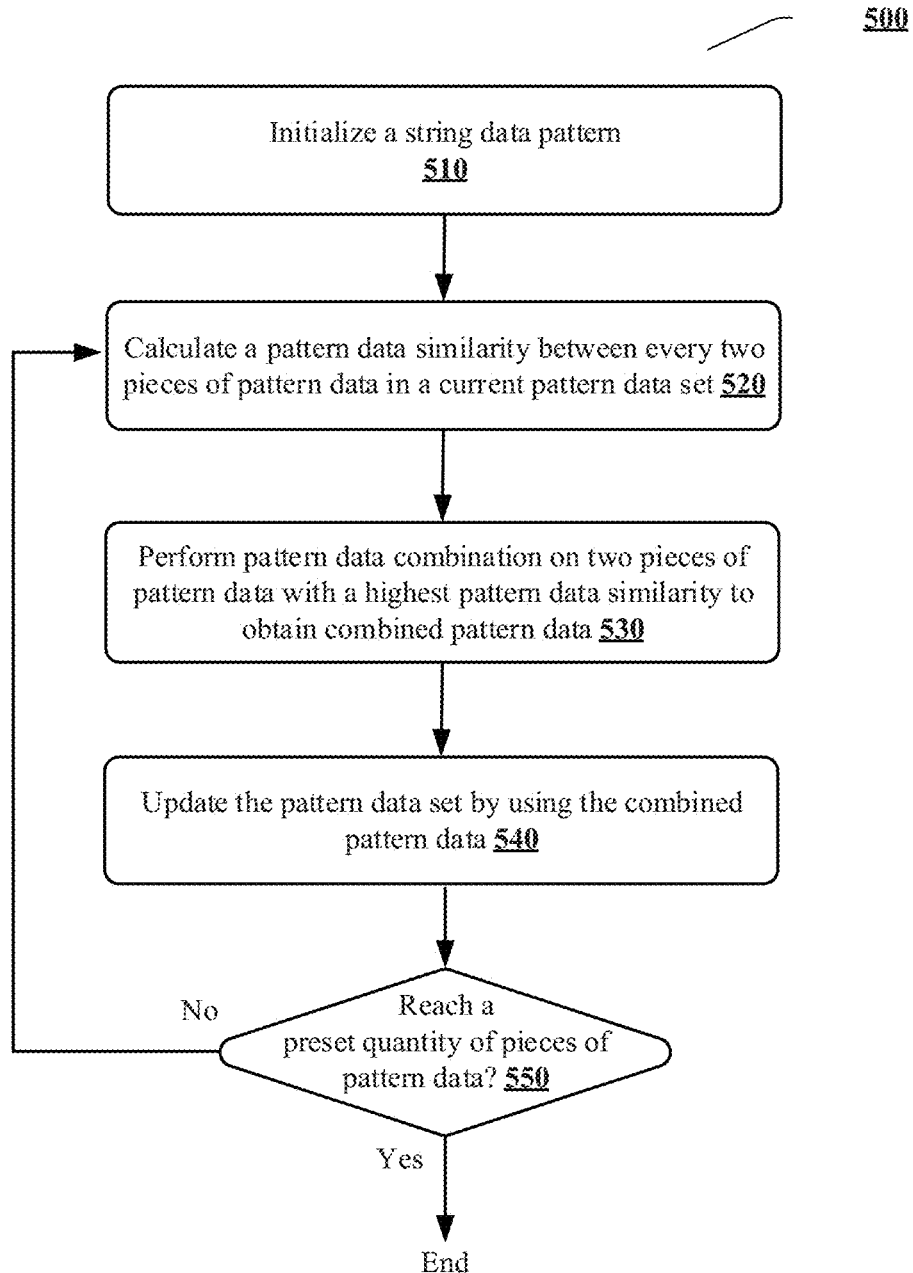
FIG. 5 is an example flowchart of a pattern data set training method according to an embodiment of this specification.

FIG. 5 is an example flowchart of a pattern data set training method 500 according to an embodiment of this specification.

As shown in FIG. 5, in step 510, each string data sample in the string data sample set is initialized as a whole to initial pattern data to generate an initial pattern data set. For example, assuming that the string data sample set includes n string data samples, each string data sample as a whole is used as one piece of initial pattern data, so as to construct an initial pattern data set with n pieces of pattern data.

Then, a pattern data set training process in steps 520 to 550 is cyclically performed until a quantity of pieces of the trained pattern data reaches a preset value, for example, k.

Specifically, during each round of pattern data set training process, in step 520, a pattern data similarity between every two pieces of pattern data in a current pattern data set is calculated. In some embodiments, the pattern data similarity may include, for example, a pattern data distance. In some embodiments, the pattern data distance may include a code length gain obtained after two pieces of pattern data are combined, that is, a code length that is added after pattern combination is performed on the two pieces of pattern data.

Figure 6:
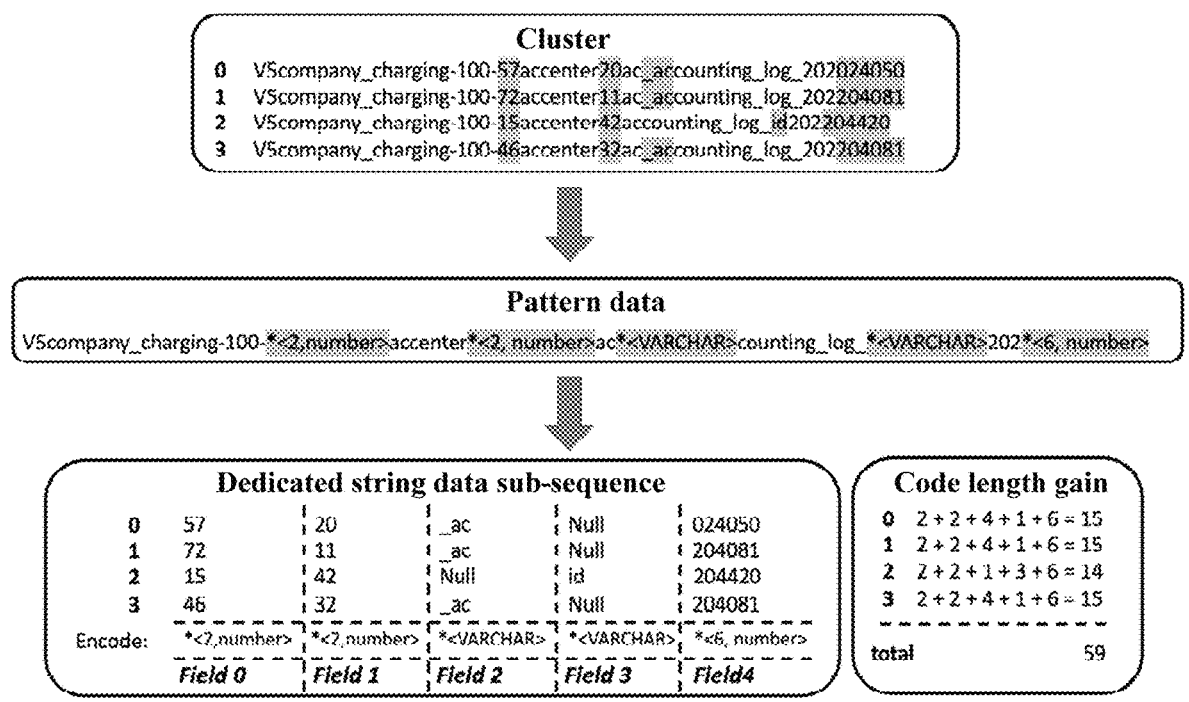
FIG. 6 is an example schematic diagram of a code length gain obtained by combining data with the same pattern data according to an embodiment of this specification.

FIG. 6 is an example schematic diagram of a code length gain obtained by combining data with the same pattern data according to an embodiment of this specification.

As shown in FIG. 6, the first four pieces of string data shown in FIG. 2 match the same pattern data "VScompany_charging-100*<2,number>accenter*<2,number>ac*<VARCHAR>counting_log_*<VARCHAR>202*<6,number>" in the pattern data set. In the pattern data, "*<2,number>" represents a wildcard that matches numeric type data with a fixed length of 2 bytes; "*<VARCHAR>" represents a wildcard that matches string data with an unfixed length. During calculation of the code length gain, a 1-byte overhead needs to be added to record the string length.

During calculation of the code length gain, for the first piece of string data, five pieces of dedicated sub-string data are extracted, which are respectively "57", "20", "_ac", "Null", and "024050". Code length gains of these five pieces of dedicated sub-string data are respectively 2 bytes, 2 bytes, 4 bytes, 1 byte, and 6 bytes, totaling 15 bytes. For the second piece of string data, five pieces of dedicated string sub-sequence data are extracted, which are respectively "72", "11", "_ac", "Null", and "204081". Code length gains of these five pieces of dedicated string sub-sequence data are respectively 2 bytes, 2 bytes, 4 bytes, 1 byte, and 6 bytes, totaling 15 bytes. For the third piece of string data, five pieces of dedicated string sub-sequence data are extracted, which are respectively "15", "42", "Null", "id", and "204420". Code length gains of these five pieces of dedicated string sub-sequence data are respectively 2 bytes, 2 bytes, 1 byte, 3 bytes, and 6 bytes, totaling 14 bytes. For the fourth piece of string data, five pieces of dedicated string sub-sequence data are extracted, which are respectively "46", "32", "_ac", "Null", and "204081". Code length gains of these five pieces of dedicated string sub-sequence data are respectively 2 bytes, 2 bytes, 4 bytes, 1 byte, and 6 bytes, totaling 15 bytes. Therefore, a code length gain obtained by combining data with the same pattern data is 59 bytes in total.

Referring back to FIG. 5, in step 530, pattern data combination is performed on two pieces of pattern data with a highest pattern data similarity to obtain combined pattern data. For example, when the pattern data similarity is represented as a code length gain obtained after the two pieces of pattern data are combined, a smaller code length gain indicates a higher pattern data similarity.

In step 540, the corresponding two pieces of pattern data in the current pattern data set are replaced with the combined pattern data, so as to update the pattern data set to obtain an updated pattern data set. A quantity of pieces of pattern data in the updated pattern data set is 1 less than a quantity of pieces of pattern data in the pattern data set before update.

In step 550, it is determined whether a quantity of pieces of pattern data in the updated pattern data set reaches a preset quantity (for example, k). If the preset quantity is reached, the pattern data set training process ends. If the preset quantity is not reached, step 520 is performed again, and the updated pattern data set is used as the current pattern data set to perform a next training process.

The following further describes the above pattern data set training process by using an example. It is assumed that the string data sample set includes 20 string data samples S1 to S20, and a preset quantity k is 5. During pattern data set training, first, the 20 string data samples S1 to S20 are initialized to 20 pieces of initial pattern data, that is, C1 to C20. Then, a pattern data similarity between every two pieces of the initial pattern data C1 to C20 is calculated. Assuming that a pattern data similarity between C1 and C2 is highest, pattern combination is performed on the pattern data C1 and C2, that is, a common string part of the pattern data C1 and C2 is extracted as combined pattern data C1'. Then, the pattern data set is updated by using the combined pattern data C1', that is, the pattern data C1 and C2 is removed from the pattern data set, and the combined pattern data C1' is added to the pattern data set, so that an updated pattern data set with 19 pieces of pattern data is obtained. Then, the updated pattern data set with the pattern data C1' and C3 to C20 is used as the current pattern data set to perform the above cyclic process, until the updated pattern data set includes five pieces of pattern data.

As described above, after the pattern data set is obtained through training, operations in steps 310 to 360 are cyclically performed on each piece of string data in the to-be-stored string data set.

Specifically, in step 310, pattern matching is performed on current string data in the to-be-stored string data set by using the pattern data set, to determine whether the current string data includes matched pattern data, that is, whether the current string data includes a string part that is consistent with any pattern data in the pattern data set.

In step 320, dedicated string data other than the matched pattern data is extracted from the current string data in response to that the current string data includes the matched pattern data. The dedicated string data may also be referred to as padding sequence data.

In step 330, the extracted dedicated string data is stored in a dedicated data storage area of the data storage system. An index relationship is formed between the stored dedicated string data and corresponding pattern data stored in the pattern data storage area. By using the index relationship, the dedicated string data can be obtained together with the corresponding pattern data during data query, so as to obtain complete string data.

In response to that the current string data does not include matched pattern data, in step 350, original data of the current string data is stored in the dedicated data storage area as a whole.

In step 360, it is determined whether the to-be-stored string data set includes unstored string data. If the to-be-stored string data set includes unstored string data, step 310 is performed again to perform a next cyclic process. If the to-be-stored string data set does not include unstored string data, the process ends.

It should be noted that the example shown in FIG. 3 is merely illustrative. In another embodiment, the above processing procedure can be performed in parallel on some or all of the string data in the string data set.

In some embodiments, the data storage system may have a pattern data storage area and a dedicated data storage area. In this case, a data structure of the stored dedicated string data includes at least an index data field and a dedicated data field, the index data field stores an index relationship that is used to index corresponding pattern data, and the dedicated data field is used to store dedicated string data. In some embodiments, the index relationship can be represented by a pattern ID. In some embodiments, the index relationship can be represented by a head address of a storage location of the corresponding pattern data in the pattern data storage area. In addition, in another embodiment, the index relationship can alternatively be represented by using another suitable representation method.

Figure 7:
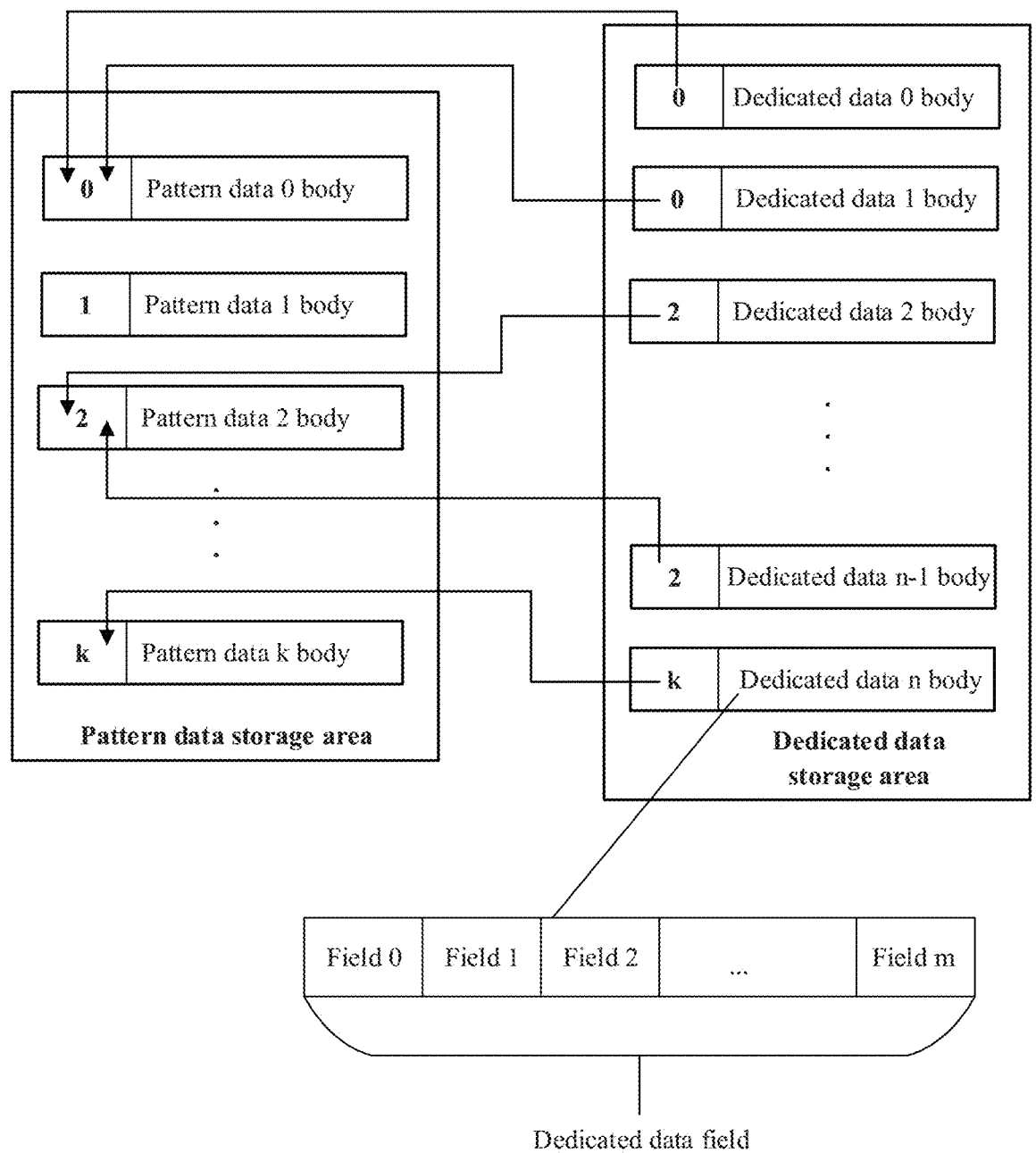
FIG. 7 is an example schematic diagram of stored string data according to an embodiment of this specification.

FIG. 7 is an example schematic diagram of stored string data according to an embodiment of this specification. In the example of FIG. 7, the to-be-stored string data set includes n+1 pieces of string data, and the trained pattern data set includes k pieces of pattern data. The k pieces of pattern data are stored in the pattern data storage area, and each piece of stored pattern data is formed into a data structure that includes a pattern ID field and a pattern data body field. The pattern ID field is used to store a pattern ID, and the pattern data body field is used to store pattern data body data. For each piece of string data, one piece of corresponding dedicated data is stored in the dedicated data storage area. The stored dedicated data is formed into a data structure that includes an index data field and a dedicated data field. The index data field is used to store the pattern ID of the corresponding pattern data and the dedicated data field is used to store the extracted dedicated data body.

In some embodiments, the extracted dedicated data can further be subdivided into a plurality of pieces of dedicated string sub-sequence data. In this case, for each piece of dedicated string sub-sequence data, the dedicated data field includes a sub-sequence data length field and a sub-sequence data body field. The sub-sequence data length field stores a data length of the dedicated string sub-sequence data, and the sub-sequence data body field stores the dedicated string sub-sequence data.

For example, for the first four pieces of string data shown in FIG. 2, one piece of pattern data "VScompany_charging-100*<2,number>accenter*<2, number>ac*<VARCHAR>counting_log_*<VARCHAR>202*<number>" is obtained through training. The pattern data can be divided into five components, and each component corresponds to one value. Therefore, the extracted dedicated data is further subdivided into five pieces of dedicated string sub-sequence data. For example, for the first piece of data in FIG. 2, the five pieces of dedicated string sub-sequence data are respectively "57", "20", "_ac", "Null", and "024050". Each dedicated string sub-sequence is stored in one field of the data structure of the stored dedicated data, for example, fields Field0, Field1, Field2, Field3, and Field4. In addition, optionally, in some embodiments, for each field of Field0, Field1, Field2, Field3, and Field4, the data structure of the stored dedicated data may further include a corresponding field length field "FieldSize".

Figure 8:
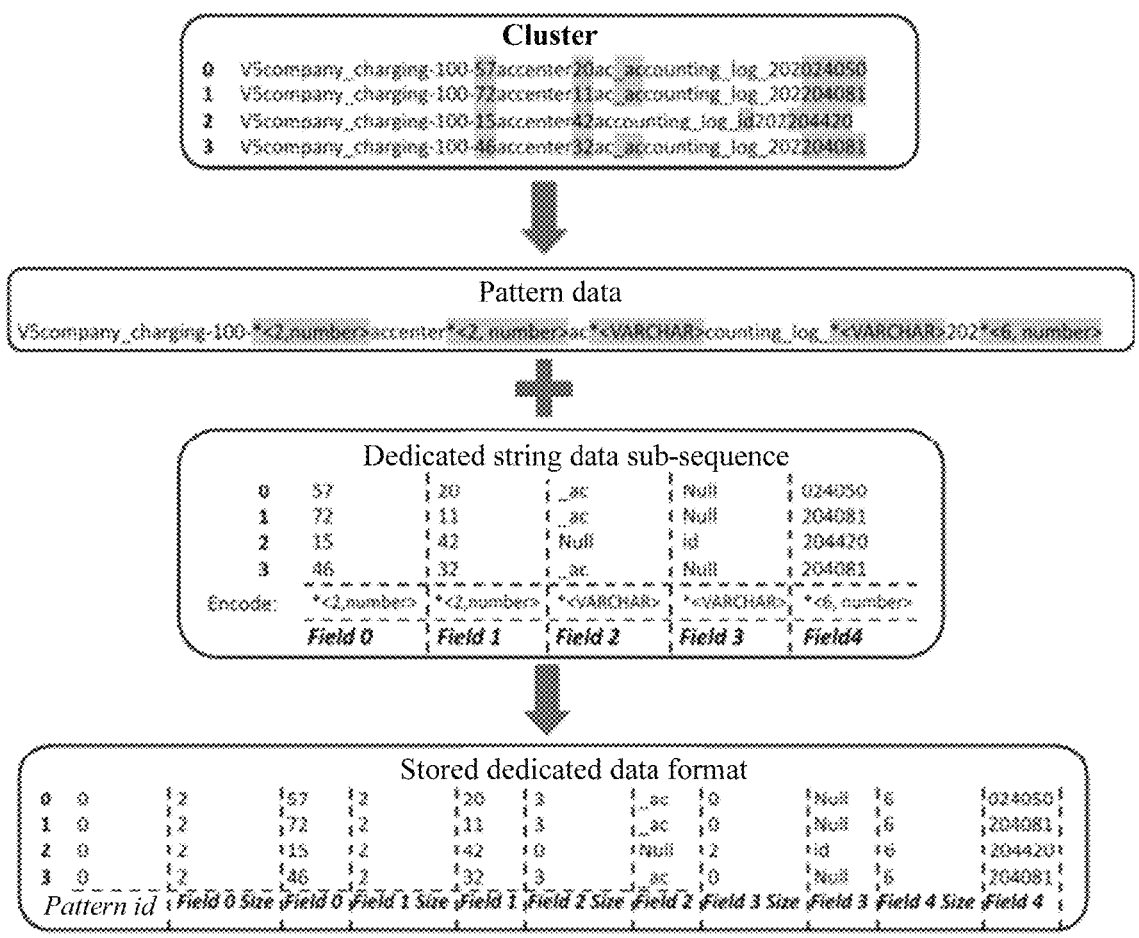
FIG. 8 is an example schematic diagram of a data structure of stored dedicated string data of string data with the same pattern data according to an embodiment of this specification.

FIG. 8 is an example schematic diagram of a data structure of stored dedicated string data of string data with the same pattern data according to an embodiment of this specification.

As shown in FIG. 8, based on the fact that the first four pieces of string data shown in FIG. 2 match the same pattern data "VScompany_charging-100*<2,number>accenter*<2, number>ac*<VARCHAR>counting_log_*<VARCHAR>202*<number>", for the first piece of string data, five pieces of dedicated string sub-sequence data are extracted, which are respectively "57", "20", "_ac", "Null", and "024050". For the second piece of string data, five pieces of dedicated string sub-sequence data are extracted, which are respectively "72", "11", "_ac", "Null", and "204081". For the third piece of string data, five pieces of dedicated string sub-sequence data are extracted, which are respectively "15", "42", "Null", "id", and "204420". For the fourth piece of string data, five pieces of dedicated string sub-sequence data are extracted, which are respectively "46", "32", "_ac", "Null", and "204081". Each piece of dedicated string sub-sequence data corresponds to one field size FieldSize, so as to obtain the stored dedicated data format shown in FIG. 7.

In some embodiments, the data storage system may include a pattern data storage area, a dedicated data storage area, and an index data storage area. In this case, for each piece of string data, corresponding index data is stored in the index data storage area, where a data structure of the stored index data includes a pattern data index field and a dedicated data index field. The pattern data index field stores pattern data index data that is used to index corresponding pattern data, and the dedicated data index field stores dedicated data index data that is used to index corresponding dedicated string data.

Figure 9:
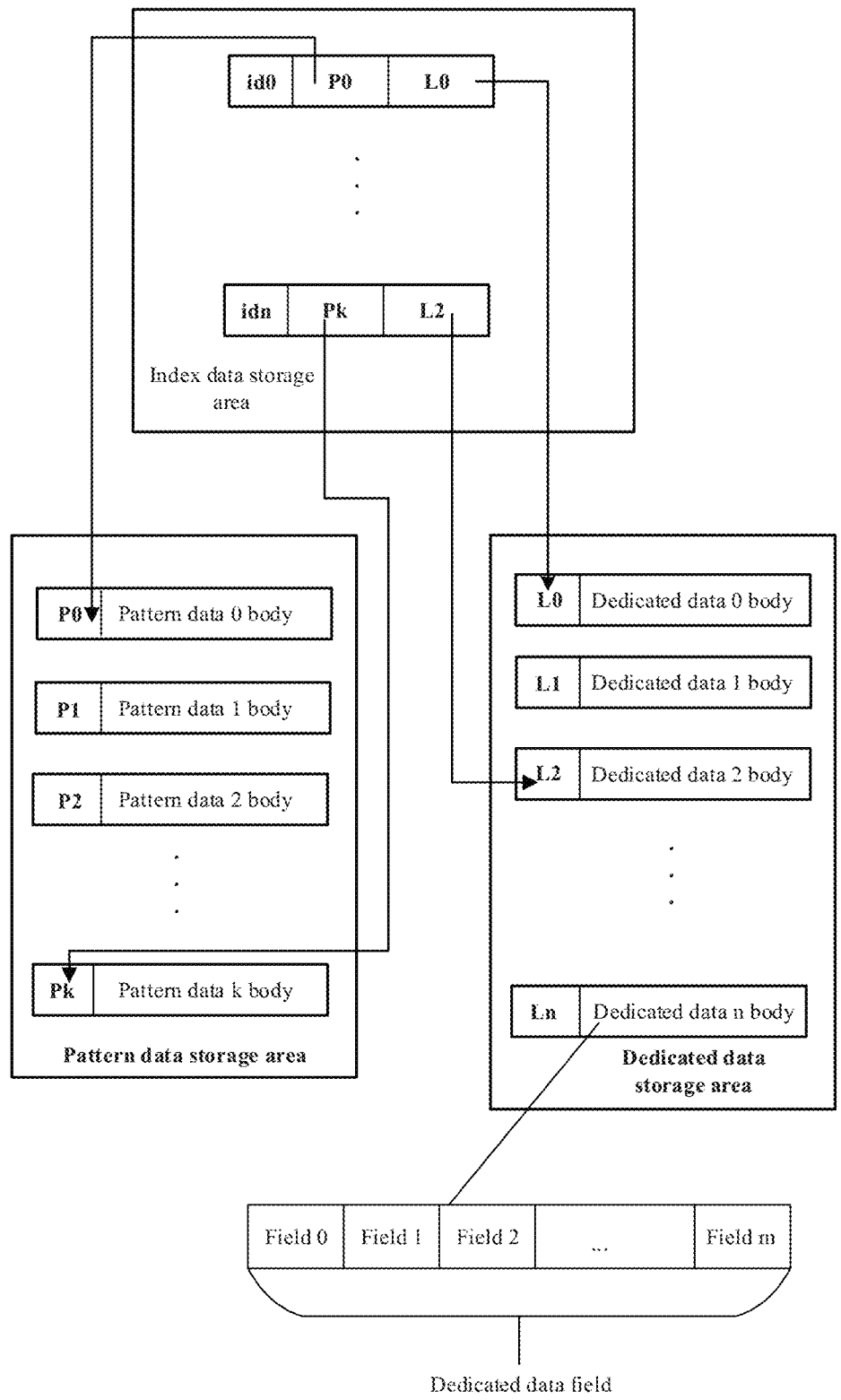
FIG. 9 is another example schematic diagram of stored string data according to an embodiment of this specification.

FIG. 9 is an example schematic diagram of stored string data according to an embodiment of this specification. In the example of FIG. 9, the to-be-stored string data set includes n+1 pieces of string data, and the trained pattern data set includes k pieces of pattern data. The k pieces of pattern data are stored in the pattern data storage area, and each piece of stored pattern data is formed into a data structure that includes a pattern ID field and a pattern data body field. The pattern ID field is used to store a pattern ID, and the pattern data body field is used to store pattern data body data. For each piece of string data, one piece of corresponding dedicated data is stored in the dedicated data storage area. The stored dedicated data is formed into a data structure that includes at least a dedicated data field. The dedicated data field is used to store the extracted dedicated data body. In addition, for each piece of string data, one piece of corresponding index data is stored in the index data storage area. A data structure of the stored index data includes a pattern data index field and a dedicated data index field. For example, for string data with an identifier id0, index data maintained in the index data storage area includes a pattern data index "P0" and a dedicated data index "L0". For string data with an identifier idn, index data maintained in the index data storage area includes a pattern data index "Pk" and a dedicated data index "L2".

In some embodiments, each piece of pattern data can be stored in the pattern data storage area after data compression. Data compression methods used for data compression of various pieces of pattern data may be the same or different. Optionally, a data compression method used for data compression of each piece of pattern data can be determined based on a data structure and a data composition of the pattern data. In some embodiments, each piece of dedicated string data can be stored in the dedicated data storage area after data compression. Data compression methods used for data compression of various pieces of dedicated data may be the same or different. Optionally, a data compression method used for data compression of each piece of dedicated string data is determined based on a data structure and a data composition of the dedicated string data.

In some embodiments, the data storage system may include a plurality of data storage devices. The pattern data storage area and the dedicated data storage area can be deployed in different data storage devices.

According to the above data storage method, a pattern data set is obtained through training based on a string data sample set sampled from a to-be-stored string data set, and each piece of pattern data in the pattern data set is stored in a pattern data storage area of a data storage system. Then, pattern matching is performed on each piece of to-be-stored string data by using the pattern data set. For string data that includes matched pattern data, dedicated string data other than the matched pattern data is extracted from the string data, the extracted dedicated string data is stored in a dedicated data storage area, independent of the pattern data storage area, of the data storage system, and an index relationship is formed between the stored dedicated string data and corresponding pattern data stored in the pattern data storage area. For string data that does not include matched pattern data, original data of the string data is stored in the dedicated data storage area as a whole. According to the above method, for a plurality of pieces of string data that include the same pattern data, a single piece of pattern data is stored only in the pattern data storage area, and remaining dedicated string data of each piece of string data is stored in the dedicated data storage area. Therefore, data storage efficiency for the string data can be improved.

According to the above data storage method, the pattern data and/or the dedicated data is subjected to data compression before data storage, thereby further reducing data storage space needed for storing string data.

According to the above data storage method, data compression methods suitable for the pattern data and/or the dedicated data are determined based on the data structure and the data composition of the pattern data and/or the dedicated data, respectively, thereby further increasing the data compression rate of the pattern data and/or the dedicated data, and thus further reducing data storage space needed for storing string data.

Figure 10:
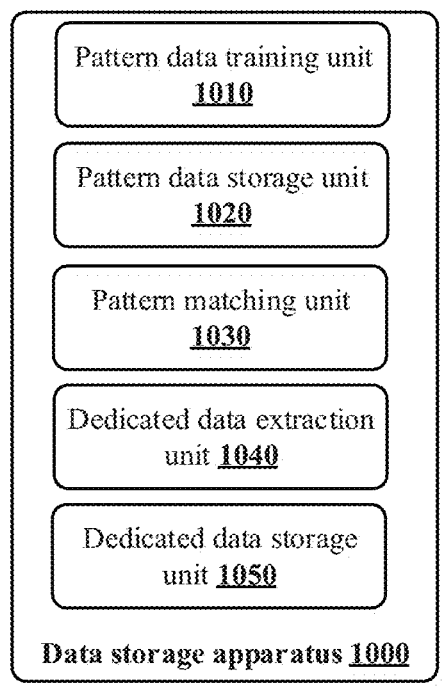
FIG. 10 is an example block diagram of a data storage apparatus according to an embodiment of this specification.

FIG. 10 is an example block diagram of a data storage apparatus 1000 according to an embodiment of this specification. As shown in FIG. 10, the data storage apparatus 1000 includes a pattern data training unit 1010, a pattern data storage unit 1020, a pattern matching unit 1030, a dedicated data extraction unit 1040, and a dedicated data storage unit 1050.

The pattern data training unit 1010 is configured to obtain, through training, a pattern data set by using a string data sample set sampled from a to-be-stored string data set, where each piece of pattern data is common string data of a plurality of string data samples. In some embodiments, the pattern data training unit 1010 can obtain, through training, the pattern data set based on a hierarchical clustering algorithm by using the string data sample set.

Figure 11:
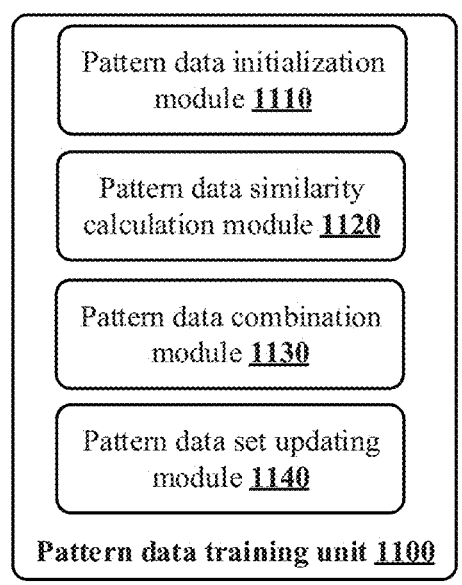
FIG. 11 is an example block diagram of a pattern data training unit according to an embodiment of this specification.

FIG. 11 is an example block diagram of a pattern data training unit 1100 according to an embodiment of this specification. As shown in FIG. 11, the pattern data training unit 1100 includes a pattern data initialization module 1110, a pattern data similarity calculation module 1120, a pattern data combination module 1130, and a pattern data set updating module 1140.

The pattern data initialization module 1110 is configured to initialize each string data sample in the string data sample set as a whole to initial pattern data to generate an initial pattern data set.

As described above, after the initial pattern data set is generated, the pattern data similarity calculation module 1120, the pattern data combination module 1130, and the pattern data set updating module 1140 perform a cyclic process until a quantity of pieces of the trained pattern data reaches a preset value.

Specifically, during each round of the cyclic process, the pattern data similarity calculation module 1120 is configured to calculate a pattern data similarity between every two pieces of pattern data in a current pattern data set. The pattern data combination module 1130 is configured to perform pattern data combination on two pieces of pattern data with a highest pattern data similarity to obtain combined pattern data. Then, the pattern data set updating module 1140 is configured to replace the corresponding two pieces of pattern data in the current pattern data set with the combined pattern data, so as to update the pattern data set, so as to update the pattern data set, where the updated pattern data set is used as the current pattern data set for a next cyclic process.

The pattern data storage unit 1020 is configured to store each piece of pattern data in a pattern data storage area of a data storage system.

The pattern matching unit 1030 is configured to perform pattern matching on each piece of string data in the to-be-stored string data set by using the pattern data set, to determine whether the string data includes matched pattern data.

The dedicated data extraction unit 1040 is configured to: for each piece of string data in the to-be-stored string data set, extract dedicated string data other than the matched pattern data from the string data in response to that the string data includes the matched pattern data.

The dedicated data storage unit 1050 is configured to: for each piece of string data in the to-be-stored string data set, store the extracted dedicated string data in a dedicated data storage area of the data storage system in response to that the string data includes the matched pattern data, where an index relationship is formed between the stored dedicated string data and corresponding pattern data stored in the pattern data storage area. In addition, in response to that string data does not include matched pattern data, the dedicated data storage unit 1050 stores original data of the string data in the dedicated data storage area as a whole.

In some embodiments, the data storage system may have a pattern data storage area and a dedicated data storage area. In this case, a data structure of the stored dedicated string data includes at least an index data field and a dedicated data field. The index data field stores an index relationship that is used to index corresponding pattern data, and the dedicated data field is used to store dedicated string data.

In some embodiments, the extracted dedicated data can further be subdivided into a plurality of pieces of dedicated string sub-sequence data. In this case, for each piece of dedicated string sub-sequence data, the dedicated data field includes a sub-sequence data length field and a sub-sequence data body field. The sub-sequence data length field stores a data length of the dedicated string sub-sequence data, and the sub-sequence data body field stores the dedicated string sub-sequence data.

In some embodiments, the data storage system may include a pattern data storage area, a dedicated data storage area, and an index data storage area. In this case, the data storage apparatus 1000 may further include an index data storage unit (not shown). For each piece of string data, the index data storage unit stores corresponding index data in the index data storage area, where a data structure of the stored index data includes a pattern data index field and a dedicated data index field. The pattern data index field stores pattern data index data that is used to index corresponding pattern data, and the dedicated data index field stores dedicated data index data that is used to index corresponding dedicated string data.

In some embodiments, the data storage apparatus 1000 may further include a data compression unit (not shown). The data compression unit is configured to perform data compression on each piece of pattern data and/or each piece of dedicated string data. Then, the pattern data storage unit stores the pattern data obtained after data compression in the pattern data storage area, and the dedicated data storage unit stores the dedicated string data obtained after data compression in the dedicated data storage area.

In some embodiments, for each piece of string data in the to-be-stored string data set, the data compression unit performs data compression on the original data of the string data as a whole in response to that the string data does not include matched pattern data. Then, the dedicated data storage unit stores the string data obtained after data compression in the dedicated data storage area.

The data storage method and the data storage apparatus described above can be implemented by using hardware, software, or a combination of hardware and software.

Figure 12:
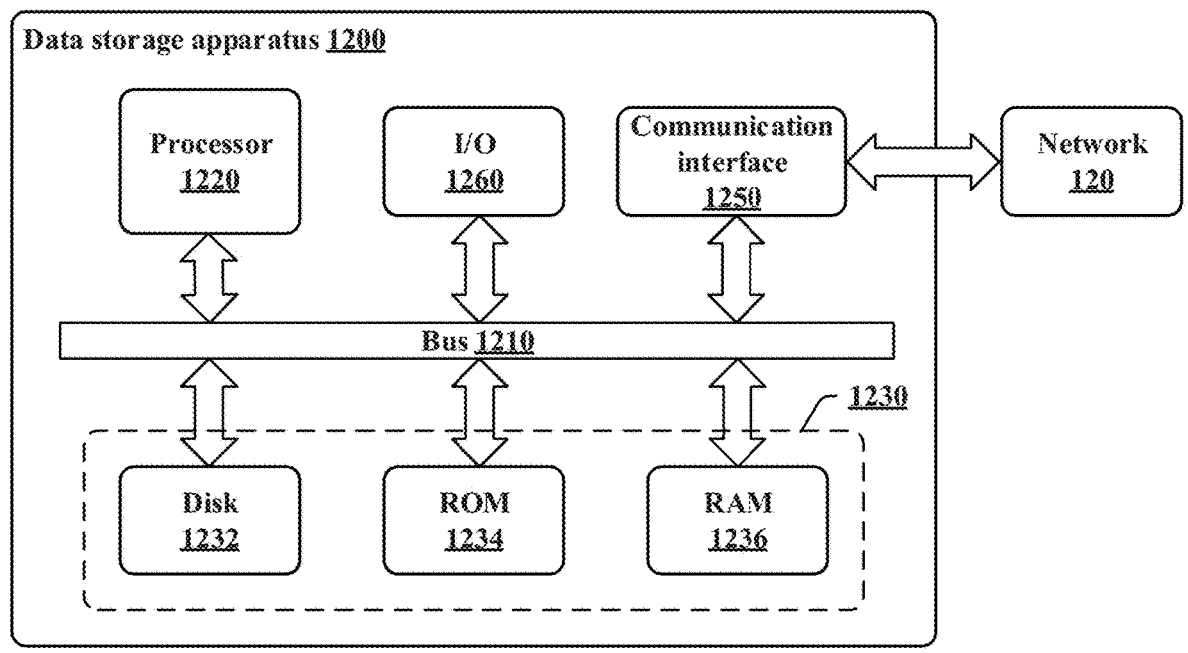
FIG. 12 is an example schematic diagram of a data storage apparatus implemented based on a computer system according to an embodiment of this specification.

FIG. 12 is an example schematic diagram of a data storage apparatus 1200 implemented based on a computer system according to an embodiment of this specification. The data storage apparatus 1200 can be deployed in a server 200, a sub-server of the server 200, or a client 300. The following provides description by using an example in which the data storage apparatus 1200 is located at the server 200. The server 200 can perform the data storage method for string data described in the embodiments of this specification.

As shown in FIG. 12, the data storage apparatus 1200 includes at least one memory 1230 and at least one processor 1220. In some embodiments, the data storage apparatus 1200 may further include a communication interface 1250 and an internal communication bus 1210. In addition, the data storage apparatus 1200 may further include an I/O component 1260.

The internal communication bus 1210 can be connected to different system components, including a storage medium 1230 and a processor 1220. The I/O component 1260 supports input/output between the server 200 and other components.

The memory (storage medium) 1230 may include a non-transient memory or a transient memory. For example, the memory 1230 may include one or more of a disk 1232, a read-only storage medium (ROM) 1234, or a random access storage medium (RAM) 1236. The memory 1230 can further store at least one instruction set. The instruction is computer program code, and the computer program code may include a program, a routine, an object, a component, a data structure, a process, a module, and the like that perform the data storage method for string data provided in the embodiments of this specification.

The communication interface 1250 is used for data communication between the data storage apparatus 1200 and the outside. For example, the data storage apparatus 1200 can connect to the network 120 through the communication interface 1250. The at least one processor 1220 is communicatively connected to the at least one storage medium 1230 through the internal communication bus 1210. The at least one processor 1220 is configured to execute the at least one instruction set. During data storage, the at least one processor 1220 reads the at least one instruction set stored in the memory 1230, and performs, based on an instruction of the at least one instruction set, the data storage method for string data provided in the embodiments of this specification. The processor 1220 can perform all steps included in the data storage method for string data.

The processor 1220 may be in a form of one or more processors. In some embodiments, the processor 1220 may include one or more hardware processors, such as a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor that can perform one or more functions, or any combination thereof. For the purpose of describing the problem only, only one processor 1220 is described in the data storage apparatus 1200 shown in FIG. 12. However, it should be noted that in another embodiment, the data storage apparatus 1200 may further include a plurality of processors. Therefore, the operations and/or method steps disclosed in the embodiments of this specification can be performed by one processor, as described in this specification, or can be performed jointly by a plurality of processors. For example, if step A and step B are performed by the processor 1220 of the data storage apparatus 1200, it should be understood that step A and step B can alternatively be performed jointly or separately by two different processors 1220 (for example, step A is performed by a first processor and step B is performed by a second processor, or step A and step B are performed jointly by the first processor and the second processor). Although the above structure is described for the server 200, this structure is also applicable to the client 300.

It should be understood that, when being executed, the computer-executable instruction stored in the memory enables the at least one processor 1220 to perform various operations and functions described above with reference to FIG. 1 to FIG. 11 in the embodiments of this specification.

Another aspect of embodiments of this specification provides a computer-readable storage medium (for example, a non-transient machine readable medium). The computer-readable storage medium stores at least one set of executable instructions for performing string data storage. When the executable instructions are executed by a processor, the executable instructions instruct the processor to implement the steps of the data storage method for string data described in the embodiments of this specification. In some possible implementations, the aspects provided in the embodiments of this specification can further be implemented in a form of a program product, including program code. When the program product runs on the data storage apparatus provided in the embodiments of this specification, the program code is used to enable the data storage apparatus to perform the steps of data storage for string data described in the embodiments of this specification. The program product used to implement the above method can use a portable compact disc read-only memory (CD-ROM) and include program code, and can run on the data storage apparatus provided in the embodiments of this specification. However, the program product provided in the embodiments of this specification is not limited thereto. In this specification, the computer-readable storage medium may be any tangible medium that includes or stores a program, and the program can be used by or in combination with an instruction execution system (for example, the processor 1220). The program product can use any combination of one or more readable media. The computer-readable storage medium may be a readable signal medium or a readable storage medium. For example, the computer-readable storage medium may include but is not limited to an electrical, magnetic, optical, electromagnetic, infrared, or semiconductor system, apparatus or device, or any combination thereof. More specific examples of the computer-readable storage media may include an electrical connection with one or more wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. The computer-readable storage medium may include a data signal that is propagated in a baseband or as a part of a carrier, and carries readable program code. Such a propagated data signal may take a variety of forms, including but not limited to an electromagnetic signal, an optical signal, or any suitable combination thereof. The computer-readable storage medium may alternatively be any computer-readable medium other than the computer-readable storage medium. The computer-readable medium can send, propagate, or transmit the program used by the instruction execution system, apparatus, or device, or used in combination with the instruction execution system, apparatus, or device. The program code included in the computer-readable storage medium can be transmitted in any suitable medium, including but not limited to a wireless medium, a wired medium, an optical cable, RF, or the like, or any suitable combination thereof. Program code for performing the operations provided in embodiments of this specification can be written in one of or any combination of a plurality of programming languages. The programming languages include an object-oriented programming language, such as Java and C++, and also include a conventional procedural programming language, such as a "C" language or a similar programming language. Alternatively, the program code can be downloaded from a server computer or a cloud by a communication network.

A person skilled in the art should understand that various variations and modifications can be made to embodiments disclosed above without departing from the essence of this specification. Therefore, the protection scope of this specification should be defined by the appended claims.

It should be noted that, not all the steps and units in the above processes and system structure diagrams are necessary, and some steps or units can be ignored based on an actual need. A sequence of performing the steps is not fixed, and can be determined based on a need. The apparatus structure described in the above embodiments may be a physical structure or a logical structure. In other words, some units can be implemented by the same physical entity, or some units can be implemented by a plurality of physical entities, or can be implemented together by some components in a plurality of independent devices.

In the above embodiments, a hardware unit or module can be implemented mechanically or electrically. For example, a hardware unit, a module, or a processor may include a permanent dedicated circuit or logic (such as a dedicated processor, FPGA, or ASIC) to complete a corresponding operation. The hardware unit or the processor may further include a programmable logic or circuit (such as a general-purpose processor or another programmable processor), and can be set temporarily by software to complete a corresponding operation. Specific implementations (mechanical methods, dedicated permanent circuits, or temporarily disposed circuits) can be determined based on cost and time considerations.

The specific implementations illustrated above with reference to the accompanying drawings describe example embodiments, but do not represent all embodiments that can be implemented or fall within the protection scope of the claims. The term "example" used throughout this specification means "used as an example, an instance, or an illustration", but does not mean "preferred" or "advantageous" over other embodiments. For the purpose of providing an understanding of the described technologies, specific implementations include specific details. However, these technologies can be implemented without these specific details. In some instances, to avoid obscuring the described concepts in the embodiments, well-known structures and apparatuses are shown in the form of a block diagram.

The foregoing descriptions of the present disclosure are provided to enable any person of ordinary skill in the art to implement or use the present disclosure. Various modifications made to the present disclosure are clear to a person of ordinary skill in the art, and the general principles defined in this specification can also be applied to other variants without departing from the protection scope of the present disclosure. Therefore, the present disclosure is not limited to the examples and designs described in this specification, but corresponds to the widest scope of principles and novel features disclosed in this specification.

What is claimed is:

1. A data storage method for string data, comprising:
    performing pattern matching on each piece of string data in a to-be-stored string data set by using a pattern data set, to determine whether the string data comprises matched pattern data in the pattern data set, wherein the pattern data set is obtained through training by using a string data sample set sampled from the to-be-stored string data set, and each piece of pattern data is common string data of a plurality of string data samples and is stored in a pattern data storage area of a data storage system;
    in response to that the string data comprises the matched pattern data, extracting dedicated string data other than the matched pattern data from the string data, and storing the extracted dedicated string data in a dedicated data storage area of the data storage system, wherein an index relationship is formed between the stored dedicated string data and corresponding pattern data stored in the pattern data storage area; and
    in response to that the string data does not comprise the matched pattern data, storing original data of the string data in the dedicated data storage area as a whole.

2. The data storage method according to claim 1, wherein a data structure of the stored dedicated string data comprises at least an index data field and a dedicated data field, the index data field stores an index relationship to index corresponding pattern data, and the dedicated data field stores dedicated string data.

3. The data storage method according to claim 2, wherein when the stored dedicated string data comprises a plurality of pieces of dedicated string sub-sequence data, for each piece of dedicated string sub-sequence data, the dedicated data field comprises a sub-sequence data length field and a sub-sequence data body field, the sub-sequence data length field stores a data length of the piece of dedicated string sub-sequence data, and the sub-sequence data body field stores the piece of dedicated string sub-sequence data.

4. The data storage method according to claim 1, wherein the data storage system further has an index data storage area, and the data storage method further comprises:
    storing corresponding index data for each piece of string data in the index data storage area,
    wherein a data structure of the stored index data comprises a pattern data index field and a dedicated data index field, the pattern data index field stores first index data to index corresponding pattern data, and the dedicated data index field stores second index data to index corresponding dedicated string data.

5. The data storage method according to claim 1, wherein the pattern data set is obtained through training based on a hierarchical clustering algorithm by using the string data sample set.

6. The data storage method according to claim 5, wherein the pattern data set is obtained by:
  initializing each string data sample in the string data sample set as a whole to initial pattern data, to generate an initial pattern data set; and
  cyclically performing a pattern data set training process until a quantity of pieces of trained pattern data reaches a preset value, wherein the pattern data set training process comprises:
  calculating a pattern data similarity between every two pieces of pattern data in a current pattern data set;
  performing pattern data combination on two pieces of pattern data with a highest pattern data similarity to obtain combined pattern data; and
  replacing the two pieces of pattern data with the highest pattern data similarity in the current pattern data set with the combined pattern data, to update the pattern data set.

7. The data storage method according to claim 6, wherein the calculated pattern data similarity comprises a pattern data distance.

8. The data storage method according to claim 7, wherein the pattern data distance comprises a code length gain obtained after the two pieces of pattern data are combined.

9. The data storage method according to claim 1, further comprising at least one of:
  performing first data compression on each piece of pattern data before the piece of pattern data is stored in the pattern data storage area; or
  performing second data compression on each piece of dedicated string data before the piece of dedicated string data is stored in the dedicated data storage area.

10. The data storage method according to claim 1, further comprising:
  performing data compression on each piece of pattern data based on a data structure and a data composition of the pattern data; and
  performing data compression on each piece of dedicated string data based on a data structure and a data composition of the dedicated string data.

11. The data storage method according to claim 1, further comprising:
  performing data compression on the original data of the string data before the original data of the string data is stored in the dedicated data storage area as a whole.

12. The method according to claim 1, wherein the data storage system comprises a plurality of data storage devices, and the pattern data storage area and the dedicated data storage area are deployed in different data storage devices.

13. A data storage apparatus for string data, comprising:
  a processor; and
  a memory storing instructions executable by the processor;
  wherein the processor is configured to:
  perform pattern matching on each piece of string data in a to-be-stored string data set by using a pattern data set, to determine whether the string data comprises matched pattern data in the pattern data set, wherein the pattern data set is obtained through training by using a string data sample set sampled from the to-be-stored string data set, and each piece of pattern data is common string data of a plurality of string data samples and is stored in a pattern data storage area of a data storage system;
  in response to that the string data comprises the matched pattern data, extract dedicated string data other than the matched pattern data from the string data, and store the extracted dedicated string data in a dedicated data storage area of the data storage system, wherein an index relationship is formed between the stored dedicated string data and corresponding pattern data stored in the pattern data storage area; and
  in response to that the string data does not comprise the matched pattern data, store original data of the string data in the dedicated data storage area as a whole.

14. The data storage apparatus according to claim 13, wherein a data structure of the stored dedicated string data comprises at least an index data field and a dedicated data field, the index data field stores an index relationship to index corresponding pattern data, and the dedicated data field stores dedicated string data.

15. The data storage apparatus according to claim 13, wherein the data storage system further has an index data storage area, and the processor is further configured to:
  store corresponding index data for each piece of string data in the index data storage area,
  wherein a data structure of the stored index data comprises a pattern data index field and a dedicated data index field, the pattern data index field stores first index data to index corresponding pattern data, and the dedicated data index field stores second index data to index corresponding dedicated string data.

16. The data storage apparatus according to claim 13, wherein the processor is further configured to obtain, through training, the pattern data set based on a hierarchical clustering algorithm by using the string data sample set.

17. The data storage apparatus according to claim 16, wherein the processor is further configured to:
  initialize each string data sample in the string data sample set as a whole to initial pattern data, to generate an initial pattern data set; and
  cyclically perform a pattern data set training process until a quantity of pieces of trained pattern data reaches a preset value, wherein the pattern data set training process comprises:
  calculating a pattern data similarity between every two pieces of pattern data in a current pattern data set;
  performing pattern data combination on two pieces of pattern data with a highest pattern data similarity to obtain combined pattern data; and
  replacing the two pieces of pattern data with the highest pattern data similarity in the current pattern data set with the combined pattern data, to update the pattern data set.

18. The data storage apparatus according to claim 13, wherein the processor is further configured to perform at least one of:
  first data compression on each piece of pattern data before the piece of pattern data is stored in the pattern data storage area; or
  second data compression on each piece of dedicated string data before the piece of dedicated string data is stored in the dedicated data storage area.

19. The data storage apparatus according to claim 13, wherein the processor is further configured to:
  perform data compression on the original data of the string data before the original data of the string data is stored in the dedicated data storage area as a whole.

20. A non-transitory computer-readable storage medium having stored thereon instructions that, when executed by a processor, cause the processor to perform a data storage method for string data, the method comprising:

performing pattern matching on each piece of string data in a to-be-stored string data set by using a pattern data set, to determine whether the string data comprises matched pattern data in the pattern data set, wherein the pattern data set is obtained through training by using a string data sample set sampled from the to-be-stored string data set, and each piece of pattern data is common string data of a plurality of string data samples and is stored in a pattern data storage area of a data storage system;

in response to that the string data comprises the matched pattern data, extracting dedicated string data other than the matched pattern data from the string data, and storing the extracted dedicated string data in a dedicated data storage area of the data storage system, wherein an index relationship is formed between the stored dedicated string data and corresponding pattern data stored in the pattern data storage area; and in response to that the string data does not comprise the matched pattern data, storing original data of the string data in the dedicated data storage area as a whole.

* * * * *